(12) United States Patent
Tanaka et al.

(10) Patent No.: US 6,898,974 B2
(45) Date of Patent: May 31, 2005

(54) SEMICONDUCTOR DYNAMIC QUANTITY SENSOR

(75) Inventors: Masaaki Tanaka, Kariya (JP); Toshiya Ikezawa, Kariya (JP); Takashige Saitou, Ama-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/465,669

(22) Filed: Jun. 20, 2003

(65) Prior Publication Data

US 2004/0007068 A1 Jan. 15, 2004

(30) Foreign Application Priority Data

Jul. 11, 2002 (JP) ........................................ 2002-202448

(51) Int. Cl.[7] ............................................. G01P 15/125
(52) U.S. Cl. .................................................... 73/514.32
(58) Field of Search ................................ 428/207, 612; 523/429

(56) References Cited

U.S. PATENT DOCUMENTS

| | | | | |
|---|---|---|---|---|
| 5,061,549 A | * | 10/1991 | Shores | ........................ 428/209 |
| 5,770,706 A | * | 6/1998 | Wu et al. | .................... 523/429 |
| 5,867,886 A | * | 2/1999 | Ratell et al. | .................. 73/727 |
| 5,872,315 A | | 2/1999 | Nagase et al. | |
| 6,193,910 B1 | * | 2/2001 | Ikai et al. | .................... 523/442 |
| 6,410,415 B1 | * | 6/2002 | Estes et al. | ................. 438/612 |
| 2002/0148297 A1 | | 10/2002 | Suzuki et al. | |
| 2004/0071962 A1 | * | 4/2004 | Tanimoto | ..................... 428/343 |

* cited by examiner

*Primary Examiner*—Edward Lefkowitz
*Assistant Examiner*—Takisha Miller
(74) *Attorney, Agent, or Firm*—Posz Law Group, PLC

(57) ABSTRACT

A semiconductor dynamic quantity sensor includes a supporting portion, an adhesive, and a sensor chip. The adhesive is located on a surface of the supporting portion. The sensor chip is located on the adhesive. The sensor chip and the supporting portion have been bonded together by heating the adhesive. The adhesive has a deformation factor of 0.5% or smaller at the temperature at which the adhesive is heated for bonding the sensor chip and the supporting portion together in order to reduce the stress caused by the hardening shrinkage of the adhesive.

16 Claims, 3 Drawing Sheets

| ANALYSIS MODEL | STEM FOR COMMON RAIL (3-D MODEL) |
|---|---|
| ELEMENT NUMBER | 9960 |
| SOLVER | MARC |
| CONSTRAINT CONDITION | XYZ CONSTRAINT AT STEM BOTTOM |
| BONDING MATERIAL THICKNESS | 75 μm |
| ELASTIC MODULAS | 3GPa |
| LINEAR EXPANSION COEFFICIENT | 60ppm |
| CHIP TILT | 0 μm |
| DIAPHRAGM THICKNESS | 90 μm |

SEMICONDUCTOR DYNAMIC QUANTITY SENSOR

CROSS REFERENCE TO RELATED APPLICATION

This application is based on and incorporates herein by reference Japanese Patent Application No. 2002-202448 filed on Jul. 11, 2002.

BACKGROUND OF THE INVENTION

The present invention relates to a semiconductor dynamic quantity sensor, and specifically relates to an adhesive for bonding a sensor chip.

A low melting point glass has been used as an adhesive when a pressure sensor chip, which is a semiconductor dynamic quantity sensor, is bonded onto, for example, a metal diaphragm. The low melting point glass is classified into leaded or unleaded in terms of environmental aspects. Leaded low melting point glass that contains lead oxide has an issue in its use in consideration of recent environmental problems. On the other hand, unleaded low melting point glass requires a bonding temperature of, for example, 400 to 500° C. because it is difficult to lower the melting point without adding lead oxide. Therefore, extra thermal energy is required for bonding, and the sensor chip can be damaged by the high bonding temperature.

Recently, it has been proposed to bond the sensor chip using an organic resin material, which would realize low temperature bonding. However, if an organic resin material such as epoxy resin was used as an adhesive, the deformation due to the setting shrinkage after heating would become so high that e stress would be generated in the sensor chip to vary the sensor output. In addition, if such a sensor would be actually packaged, the stress would decrease due to the creeping phenomenon at the temperature in use. As a result, the sensor output would also vary due to the creeping phenomenon.

SUMMARY OF THE INVENTION

The present invention has been made in view of the above aspects with an object to provide a semiconductor dynamic quantity sensor the output variation of which is relatively small.

To achieve the above object, a semiconductor dynamic quantity sensor according to the present invention includes a supporting portion, an adhesive, and a sensor chip. The adhesive is located on a surface of the supporting portion. The sensor chip is located on the adhesive. The sensor chip and the supporting portion have been bonded together by heating the adhesive. The adhesive has a deformation factor of 0.5% or smaller at the temperature at which the adhesive is heated for bonding the sensor chip and the supporting portion together in order to reduce the stress caused by the hardening shrinkage of the adhesive.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in detail with reference to various embodiments.

First Embodiment

Figure 1A:
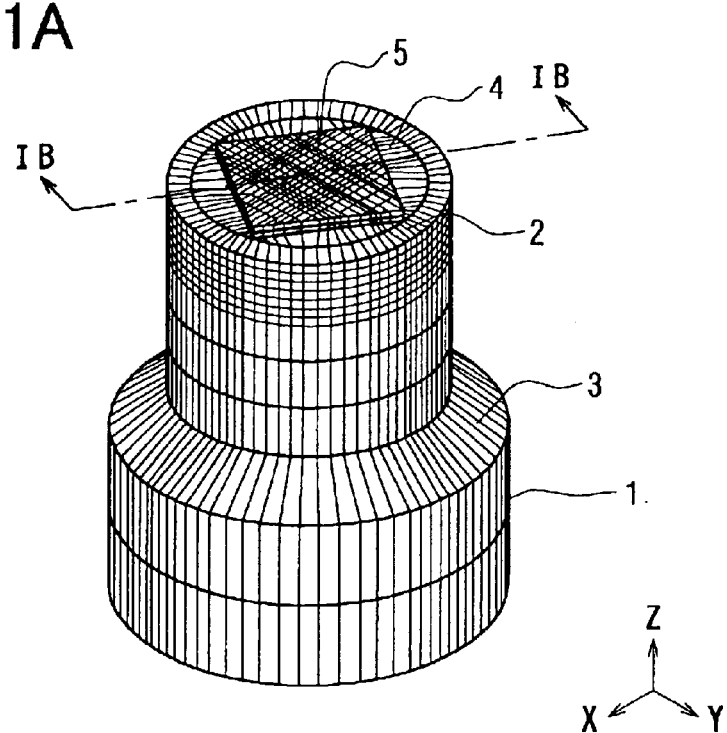
FIG. 1A is a schematic perspective view of a pressure sensor according to an embodiment of the present invention.

FIG. 1A is a schematic perspective view of a pressure sensor 1 as an example of the present embodiment. The pressure sensor 1, which is a semiconductor dynamic quantity sensor, can be used for, for example, controlling the fuel injection pressure of the engine or the brake pressure in a vehicle. The pressure sensor 1 includes a metal stem 3, or a metal stage 3, that has a disk-shaped metal diaphragm 2, or a supporting portion 2. The pressure sensor 1 also includes an adhesive 4 and a sensor chip 5. The sensor chip 5 has been bonded to the upper surface of the supporting portion 2 at a predetermined bonding temperature using the adhesive 4.

Figure 1B:
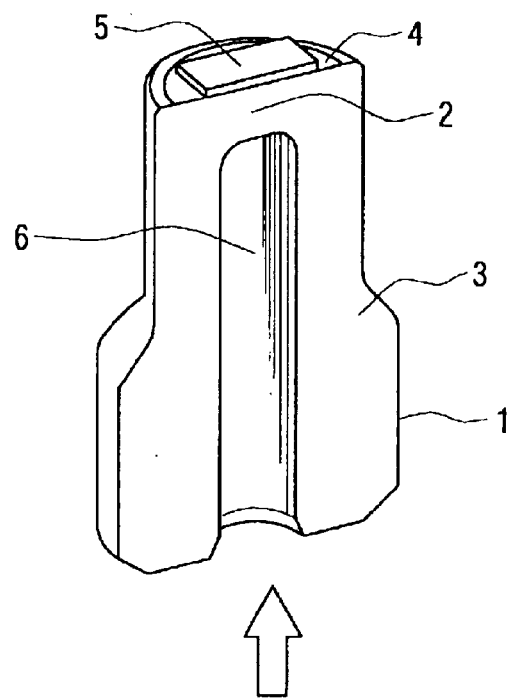
FIG. 1B is a schematic cross-sectional perspective view of the sensor in FIG. 1A taken along the line IB—IB.
Figure 2:
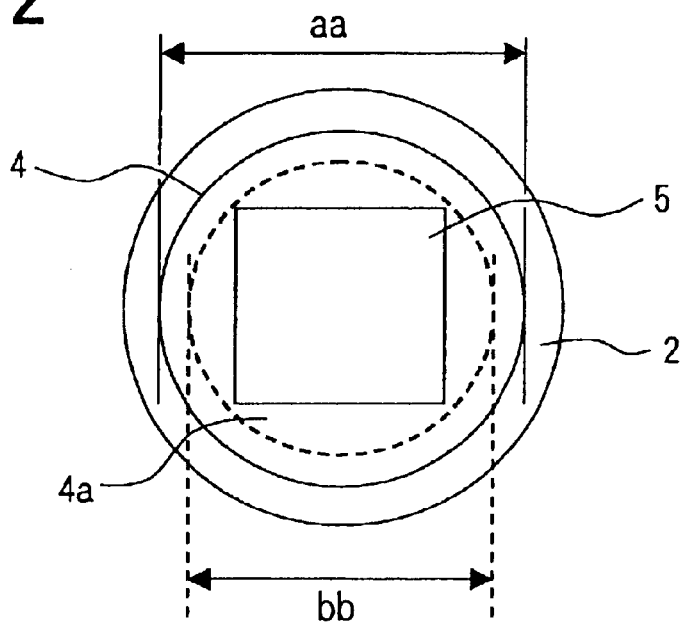
FIG. 2 is a plan view of the sensor in FIG. 1A when viewed from above the sensor chip of the sensor in FIG. 1A.

As shown in FIGS. 1A and 1B, the metal stem 3 has a cavity 6 beneath the upper surface, where the sensor chip 5 is located. A predetermined pressure medium such as a gas and a liquid is introduced into the cavity 6, and the pressure of the pressure medium is detected on the basis of the deformation of the supporting portion 2 and the deformation of the sensor chip 5.

The bonding temperature when the sensor chip 5 is bonded to the supporting portion 2 using the adhesive 4 is preferably 350° C. or lower. If the bonding temperature is higher than 350° C., the elements that make up the sensor chip 5, which are not illustrated in the figure, may be thermally ruined. In the present invention, as described later, it is possible to sufficiently bond the sensor chip 5 and the supporting portion 2 together at a low temperature lower than 350° C. using an organic resin material as the adhesive 4. In addition, it is possible to cut the cost by reducing the thermal energy consumed at the bonding step using the low temperature bonding.

The metal stem 3 is made of, for example, KOVAR, which is an alloy of Fe—Ni—Co system. The metal stem 3 should be preferably made of a material that has a linear expansion coefficient as close to that of the sensor chip 5 as possible. The metal stem 3 has the cavity 6, which has been machined in the shape of a cylinder by cutting, and the supporting portion 2, which is a diaphragm, is located at an end of the metal stem 3. As illustrated by an arrow in FIG. 1B, the pressure medium is introduced into the cavity 6 from its entrance to pressurize the supporting portion 2.

The sensor chip 5 is made of, for example, a square single crystal silicon substrate, which is a semiconductor substrate. The sensor chip 5 has been fixed to the upper surface of the supporting portion 2 at a first surface thereof using the adhesive 4. Although not illustrated in the figure, in a second surface of the sensor chip 5, which is opposite to the first surface, four piezo resistance elements that have a predetermined resistance have been formed and arranged at predetermined positions. The piezo resistance elements make up a bridge circuit in combination with wiring lines and electrodes, which are not illustrated in the figure. The second surface has been covered by a passivation film such as silicon nitride, which is not illustrated in the figure.

The pressure sensor 1 detects a pressure as follows. When a pressure is applied in the direction shown by the arrow in FIG. 1B, the supporting portion 2 and the sensor chip 5 are deformed by the pressure medium to generate a stress in the sensor chip 5. At that time, each of the above piezo resistance elements has each stress level. The difference between the stress levels causes the variation in the sensor output, and the variation in the sensor output is detected as the variation in the pressure.

An organic resin material, a liquid crystal polymer, a material that is prepared by adding an inorganic filler to an organic resin material, or a hybrid material in which an organic resin material and an inorganic filler have been chemically coupled may be used for the adhesive 4 to bond the sensor chip 5 to the supporting portion 2. The common characteristic of the adhesives 4 made of the above materials is that each of the adhesives 4 has a deformation factor of 0.5% or smaller, which is defined on the basis of the shrinkage amount of each of the adhesives 4 when hardened, and that each of the adhesives 4 is formed in the shape of a film.

The deformation factor of the adhesive 4 is defined by the following equation eq.1, $$\text{Deformation Factor }(\%) = \{(aa-bb)/aa\} \times 100 \qquad \text{eq.1,}$$

where aa is the diameter of the adhesive 4 before the adhesive 4 is heated and bb is the diameter of the shrunk adhesive 4a that is formed by heating the adhesive 4 at a predetermined temperature, which is, for example, 100 to 250° C., for a predetermined duration, which is, for example, 1 to 8 hours, in order to bond the sensor chip 5 to the supporting portion 2.

Figure 3:
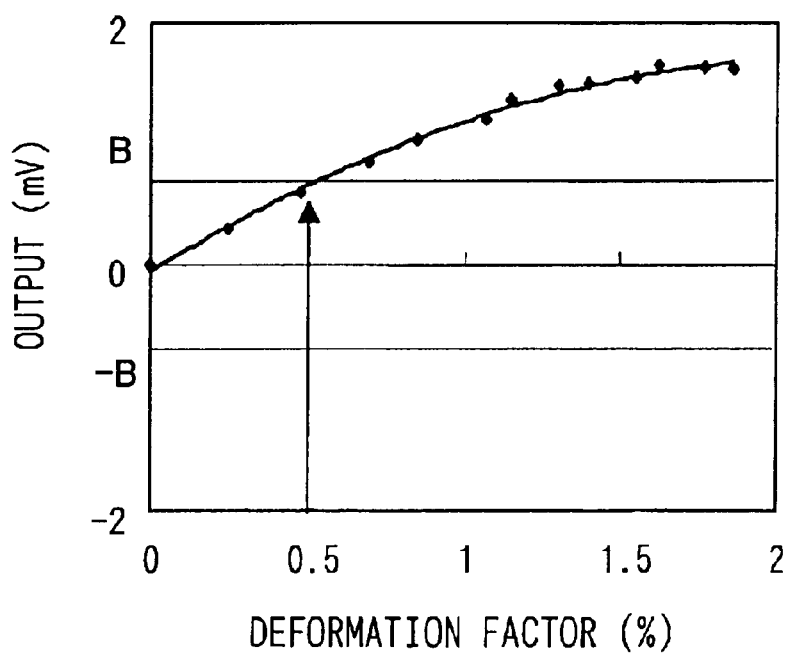
FIG. 3 is a graph that shows the correlation between the sensor output and the deformation factor.

FIG. 3 is a graph that shows the correlation between the sensor output and the deformation factor. The sensor output values plotted in FIG. 3 have been calculated by a simulation using the parameters listed in FIG. 4. If the tolerance in the false sensor output of the pressure sensor 1 that is generated by the deformation of the adhesive 4 is ±B mV, the deformation factor must be about 0.5% or smaller in order to satisfy that the false sensor output is within the tolerance.

There may be a case that the sensor output of the pressure sensor 1 deviates from its initial value at the actual environmental temperature, which is, for example, −40 to 120° C., in use of the pressure sensor 1, even if the initial value satisfies a predetermined product specification. Taking the case into consideration, the inventors of the present invention confirmed using simulation how much the sensor output of the pressure sensor 1 deviates from its initial value when the stress generated in the sensor chip 5 due to the hardening shrinkage of the adhesive 4 relaxes and decreases due to the creeping phenomenon with time at 120° C., which is the maximum temperature in the above actual environmental temperature.

Figures 4, 5:
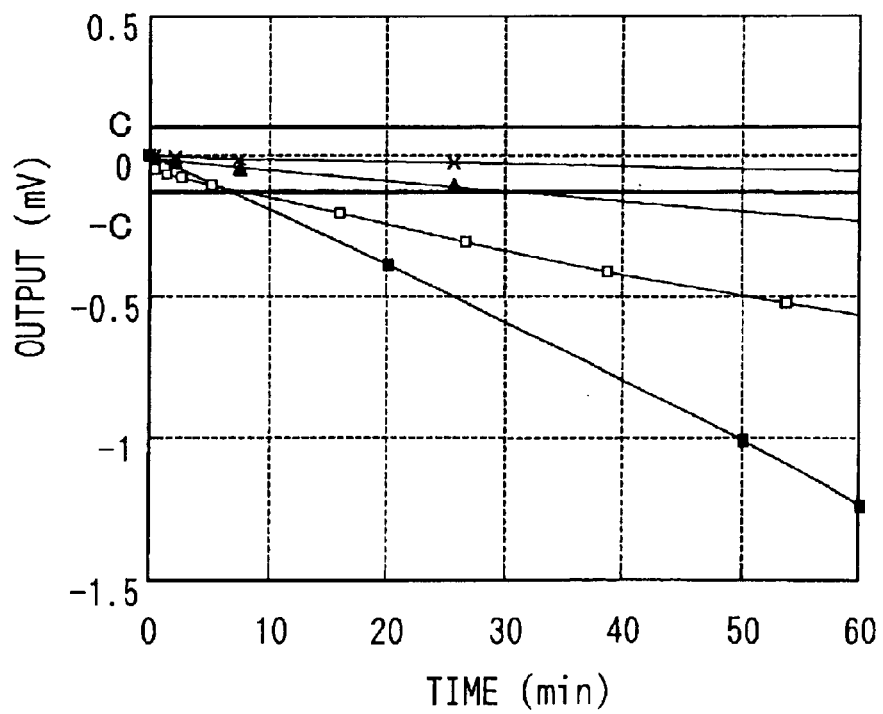
FIG. 4 is a table that shows the parameters of a simulation.
FIG. 5 is a graph that shows the correlation between the sensor output and the time at the deformation factor at 120° C.

FIG. 5 shows the simulation results. The simulation was carried out using the parameters listed in FIG. 4. In FIG. 5, the symbols ×, ▲, and □ respectively represent the simulated values at deformation factors of 0.5, 1.0, and 1.6%. The symbol ■ represents the actually measured value at a deformation factor of 1.6%. The above deformation factors are obtained by conducting the heating at 80° C. for two hours, 150° C. for four hours, and 230° C. for one hour, respectively.

Here, if the tolerance of the deviation from the initial sensor output is ±C mV, the deformation factor of the adhesive 4 must be about 0.5% or smaller, as shown in FIG. 5. Therefore, as understood from the results shown in FIGS. 3 and 5, it is possible to control the deviations from the initial sensor output due to the hardening shrinkage of the adhesive 4 and the creeping phenomenon generated at the actual environmental temperature in use of the pressure sensor 1.

Next, an explanation will be made on the adhesive 4. If epoxy resin alone was used as the organic resin material for the adhesive 4, the deformation factor would be about 1.8% due to the volume reduction caused by the phase shift from liquid to solid and the volatilization of solvent at the bonding temperature. As a result, the stress generated in the sensor chip 5 due to the deformation would increase the deviation in the sensor output.

However, for example, if liquid epoxy resin is thinly coated on a carrier film made of PET and half-hardened to form a film-shaped adhesive 4, it is possible to reduce the deformation factor to about 0.5% at the temperature when the sensor chip 5 is bonded to the supporting portion 2 because the adhesive 4 is substantially in a solid state, although an additional hardening reaction is still required. Therefore, the film-shaped adhesive 4 can be used for manufacturing the pressure sensor 1. Incidentally, polyimide and polyurethane may be used as the organic resin material other than epoxy resin.

Alternatively, a film-shaped adhesive 4 may be formed using liquid crystal polymer instead of the liquid epoxy resin. Since liquid crystal polymer has crystallinity in its liquid state, there is no volume reduction that is caused during the shift from amorphous phase to crystalline phase in ordinary organic resin materials. Further, the overall contraction factor is relatively small. In addition, liquid crystal polymer is oriented along its flow direction, so the linear expansion coefficient along the direction is extremely small. Therefore, it is possible to reduce the deformation factor of the adhesive 4 to 0.5% or lower by using liquid crystal polymer as the organic resin material for the adhesive 4, and also possible to reduce the output deviation at the actual environmental temperature in use of the pressure sensor 1 to about 0.05 mV.

Alternatively, as described earlier, a material that is prepared by adding a predetermined amount of inorganic filler to an organic resin material may be used for the adhesive 4 to bond the sensor chip 5 to the supporting portion 2. Specifically, for example, the material prepared by adding single crystal silicon or silicon oxide to epoxy rein, polyimide, or polyurethane with a ratio of 70 to 90 wt % to 10 to 30 wt % may be formed in the shape of a film. The linear expansion coefficient of the organic resin material is as high as, for example, 40 to 70 ppm.

However, it is possible to approximate the linear expansion coefficient of the adhesive 4 to that of the silicon substrate used as the semiconductor substrate of the sensor chip 5 and that of the metal stem 3 by adding silicon or silicon oxide for lowering the linear expansion coefficient. The linear expansion coefficients of the silicon substrate and the metal stem 3 are, for example, 1 to 10 ppm. It is possible to reduce each stress generated in each member by approximating the linear expansion coefficient of the adhesive 4 to that of the silicon substrate and that of the metal stem 3. In that case as well, it is possible to reduce the deformation factor to about 0.5%.

Alternatively, as described earlier, a hybrid material in which an organic resin material and an inorganic filler have been chemically coupled may be used for the adhesive 4 to bond the sensor chip 5 to the supporting portion 2, too. Such a hybrid material may be prepared, for example, by: mixing a predetermined amount of epoxy resin, which is an organic resin material, and a predetermined amount of alkoxysilane, which is an inorganic filler; and promoting sol-gel reaction, which is hydrolysis and condensation of alkoxysilane, by heating at 100 to 200° C. for 1 to 2 hours.

In this case as well, it is possible to approximate the linear expansion coefficient of the adhesive 4 to that of the silicon substrate and that of the metal stem 3 by adding silicon. In addition, the adhesive 4 becomes in the half-hardened state due to the sol-gel reaction, so the deformation factor in the hardening reaction is reduced. As a result, it is possible to reduce the deformation factor to about 0.5%.

In this embodiment, it is possible to reduce the stress caused by the hardening shrinkage of the adhesive 4 at the bonding step and possible to reduce the initial output deviation of the pressure sensor 1 by using: an organic resin material; a liquid crystal polymer; a material that is prepared by adding an inorganic filler to an organic resin material; or a hybrid material in which an organic resin material and an inorganic filler have been chemically coupled as an adhesive having a deformation factor of 0.5% or smaller when the sensor chip 5 is bonded to the supporting portion 2 using the adhesive 4 at a predetermined bonding temperature.

Moreover, the stress relaxation due to the creeping phenomenon at the actual environmental temperature in use of the pressure sensor 1 after packaging is reduced by the above stress reduction. Therefore, the output deviation due to the stress relaxation is suppressed, and the pressure sensor 1 operates stably.

Other Embodiments

In the first embodiment, the adhesive 4 is formed as a film. However, the present invention is not limited to the adhesive 4 being formed as a film as long as the deformation factor of the adhesive 4 is 0.5% or lower.

In the first embodiment, the sensor chip 5 is bonded to the metal diaphragm 2, or the supporting portion 2, using the adhesive 4 having a deformation factor of 0.5% or lower. However, the supporting portion 2 does not have to be a metal diaphragm and may be made of other material.

What is claimed is:

1. A semiconductor dynamic quantity sensor comprising:
    a supporting portion;
    an adhesive, which is located on a surface of the supporting portion; and
    a sensor chip, which is located on the adhesive, wherein the sensor chip and the supporting portion have been bonded together by heating the adhesive and wherein the adhesive has a deformation factor of 0.5% or smaller at a temperature at which the adhesive is heated for bonding the sensor chip end the supporting portion together in order to reduce a stress caused by a hardening shrinkage of the adhesive, wherein the deformation factor is determined based on a diameter of the adhesive before being heated once minus the diameter of the adhesive after being heated once.

2. The sensor according to claim 1, wherein the adhesive is in a shape of a film.

3. The sensor according to claim 2, wherein the adhesive is made of one of an organic resin material and a liquid crystal polymer.

4. The sensor according to claim 2, wherein the adhesive is made of a material that is prepared by adding a predetermined amount of an inorganic filler to an organic resin material.

5. The sensor according to claim 2, wherein the adhesive is made of a hybrid material in which an organic resin material and an inorganic filler have been chemically coupled.

6. The sensor according to claim 1, wherein the temperature at which the adhesive is heated is 350° C. or lower.

7. The sensor according to claim 1, wherein the sensor chip is a dynamic quantity sensor for controlling one of a fuel injection pressure and a brake pressure in a vehicle.

8. The sensor according to claim 1, further comprising a metal stem on which the supporting portion is located, the metal stem having a cavity below the surface of the supporting portion for receiving a pressure medium having an associated pressure for deforming the sensor chip and the adhesive.

9. A semiconductor dynamic quantity sensor comprising:
    a metal stage having a metal diaphragm and defining a cavity therein for receiving a pressure medium;
    an adhesive located on a surface of the metal diaphragm and having a deformation factor of no greater than 0.5%; and
    a pressure sensor chip bonded to the metal diaphragm by the adhesive, the pressure sensor chip for sensing a pressure of the pressure medium in the cavity, wherein the deformation factor is determined based on a diameter of the adhesive before being heated once minus the diameter of the adhesive alter being heated once.

10. The sensor according to claim 9, wherein the adhesive comprises an adhesive film.

11. The sensor according to claim 10, wherein the adhesive is made of one of an organic resin material and a liquid crystal polymer.

12. The sensor according to claim 10, wherein the adhesive is made of a material including a predetermined amount of an inorganic filler added to an organic resin material.

13. The sensor according to claim 10, wherein the adhesive is made of a hybrid material in which an organic resin material and an inorganic filler have been chemically coupled.

14. The sensor according to claim 9, wherein the adhesive is heated to a temperature no greater than 350° C.

15. The sensor according to claim 9, wherein the metal stage is made from an Fe—Ni—Co alloy.

16. The sensor according to claim 9, wherein the metal stage is made from a material having a linear expansion coefficient that approximates that of the sensor chip.

* * * * *